United States Patent [19]
Roudebush et al.

[11] Patent Number: 5,705,006
[45] Date of Patent: Jan. 6, 1998

[54] FIRE RESISTANT REPAIR PATCH AND METHOD

[75] Inventors: Thomas Roudebush, Overland Park; Thomas Haxton, Leawood, both of Kans.; Robert L. McGeary, Kansas City, Mo.; Bill Clarke, Irvine, Calif.

[73] Assignee: Akro Fireguard Products, Inc., Lenexa, Kans.

[21] Appl. No.: 306,674

[22] Filed: Sep. 15, 1994

Related U.S. Application Data

[63] Continuation of Ser. No. 818,824, Jan. 10, 1992, abandoned, which is a continuation of Ser. No. 617,342, Nov. 23, 1990, abandoned.

[51] Int. Cl.$^6$ .................................................. B32B 31/00
[52] U.S. Cl. ........................... 156/98; 156/94; 156/285; 156/307.3; 156/304.3; 428/61; 427/140; 427/196; 427/208.2; 427/386
[58] Field of Search ...................... 156/94, 98, 285, 156/307.3, 304.3; 428/61; 427/140, 196, 208.2, 386

[56] References Cited

U.S. PATENT DOCUMENTS 5,145,541  9/1992  Baron et al. ..................... 156/98

Primary Examiner—Richard Weisberger
Attorney, Agent, or Firm—Chase & Yakimo

[57] ABSTRACT

A fire resistant patch for aircraft composite cargo bay liners. The patch includes a base member consisting of at least one inner sheet of woven fiberglass with outer layers of flame resistant plastic. A scrim consisting of a fiberglass lattice netting having a periphery larger than that of the base member includes a pressure sensitive adhesive on a bottom side thereof is also provided. A layer of resin containing a flame retardant additive is applied to the bottom side of the base member, and the base member is applied to the liner to cover the damaged area thereof. The resin layer is allowed to partially cure to retard movement of the base member. Strips of flame resistant tape may be affixed over the base member to hold it in place instead of the partial curing. The scrim is then placed over the base member and tape on the liner using the pressure sensitive adhesive. The scrim is placed such that the periphery thereof extends beyond the entire periphery of the base member. The peripheral area of the scrim extending beyond the base member is fixed to the liner using the adhesive on the scrim. The epoxy resin containing the flame resistant additive is then applied over the scrim, tape and base member. The resin coating is continuous and extends beyond the periphery of the scrim. Upon curing the resin provides structural strength and protects the base member from impinging flame.

11 Claims, 2 Drawing Sheets

FIRE RESISTANT REPAIR PATCH AND METHOD

This is a continuation of application Ser. No. 07/818,824, filed Jan. 10, 1992, now abandoned, which is a continuation of application Ser. No. 07/617,324, filed Nov. 23, 1990, which is now abandoned.

BACKGROUND OF THE INVENTION

1. Field of the Invention

The present invention relates in general to repair patches for damaged materials. In particular, the present invention relates to an improved fire resistant composite patch for use in aircraft cargo bay liners.

2. Description of the Related Art

The cargo sections or bays of aircraft often include a composite interior shell or liner. This liner protects the various electrical, hydraulic and fuel lines adjacent the fuselage of the aircraft. During loading and unloading of cargo, however, the cargo bay liner is often damaged. This damage can result in the lines being exposed, posing the danger of possible damage to these lines.

Due to the extremely important nature of the lines protected by the bay liner, repairs of the liner must meet stringent requirements. In particular, the repair patch is required to be fire resistant. Damaged areas of the bay liner were repaired, however, by a composite patch attached by pressure sensitive adhesive.

This adhesive method of repair has not been particularly costly in terms of either material labor. However, such patches are not sufficiently fire resistant. This poses a danger to the lines sought to be protected.

SUMMARY OF THE INVENTION

An object of the present invention is to provide a patch for a composite cargo bay liner which is both inexpensive to produce and inexpensive to apply.

A further object is to provide a patch having sufficient structural strength.

Another object of the present invention is to provide a composite patch which provides sufficient flame resistance to be used in a cargo bay liner of an aircraft.

Yet another object is to provide a flame resistant repair patch for a cargo bay liner which will reduce egress of smoke through the patch.

These and other objects are achieved by the present invention, which comprises a fire resistant cargo bay liner patch, and a method of applying such patch.

To repair a damaged section of cargo bay liner according to the present invention, a base member is supplied. This base member includes inner layers of woven fiberglass and outer layers of a fire resistant plastic.

A quantity of self curing resin having a flame retardant additive is also supplied in two-component form. The components of the resin are mixed together and then applied to the periphery of one side of the base member.

The base member is then pressed into place over the damaged area on the bay liner. In order to retain the base member in place, strips of fire retardant adhesive tape are applied over the base member and affixed to the bay liner. The base member is then reinforced with a fiberglass scrim.

This scrim is in the form of a lattice of fiberglass with a pressure sensitive adhesive applied to the rear side thereof. A release sheet covers and protects the pressure sensitive adhesive on the scrim. The release sheet is removed from the back of the fiberglass scrim, and the scrim is then applied to the cargo bay liner over the base member. The fiberglass scrim is somewhat larger than the base member, and the periphery of the scrim extends beyond the periphery of the base member.

The remainder of the self-curing resin is then applied over the fiberglass scrim and base member on the cargo bay liner, the resin is applied in an even layer completely covering the base member and scrim, and extending to or beyond the periphery of the fiberglass scrim.

Upon curing, the epoxy forms a rugged and rigid material which reinforces the fiberglass scrim and the composite patch. The resin completely seals the periphery of the damaged area below the base member and completely covers the base member and scrim. Since the resin includes a flame retardant component, the entire repair patch provides sufficient flame resistance to enable its use within an aircraft cargo bay liner.

By achieving the above objects, the repair patch and method of repairing of the present invention reduce the capital and labor expenditures required to provide a structurally secure and fire resistant repair. The repair patch and method of repair of the present invention also provide increased safety in case of fire.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 3:
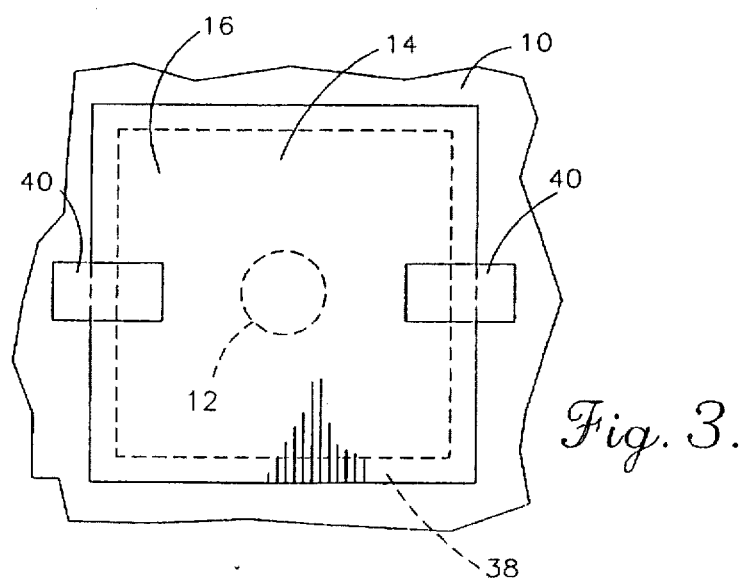
FIG. 3 is a top view of a partially completed repair according to the present invention.
Figure 4:
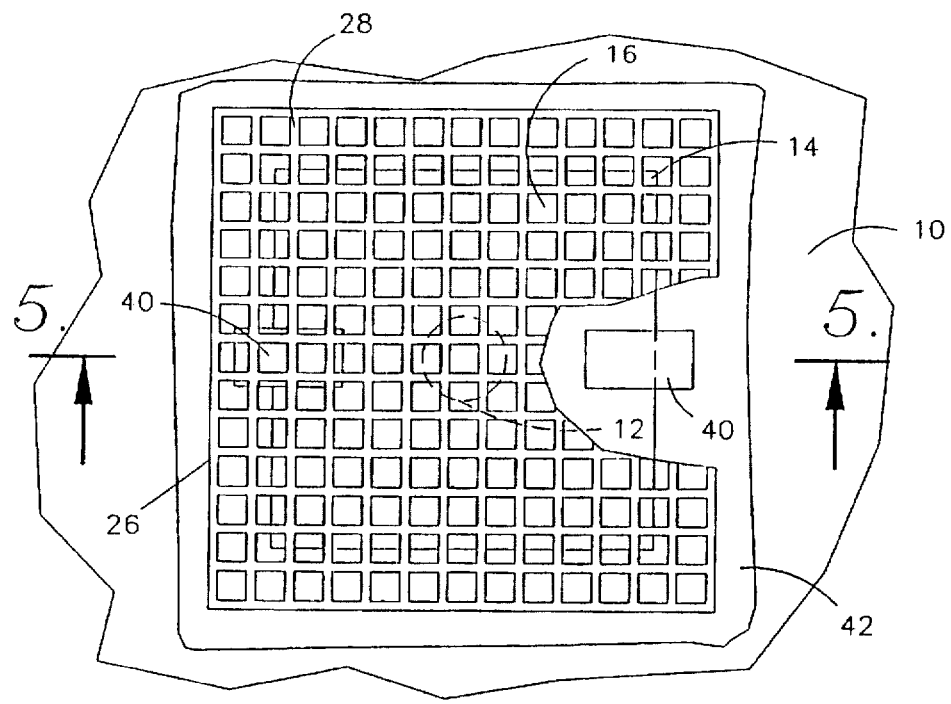
FIG. 4 is a top view of a completed repair according to the present invention.
Figure 5:
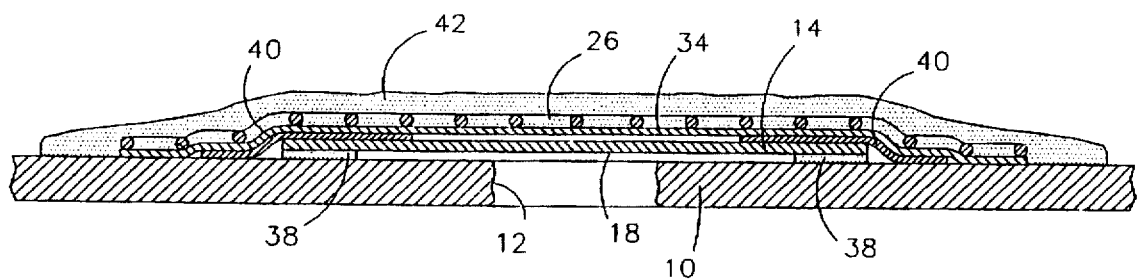
FIG. 5 is a cross-sectional view of the repair of FIG. 4.

By way of introduction, the repair patch and method of repair according to the present invention are applied to a substrate 10 having a damaged area 12 therein. The substrate 10 is preferably a base panel of a cargo bay liner for an aircraft. This is best shown in FIGS. 3–5.

Figure 1:
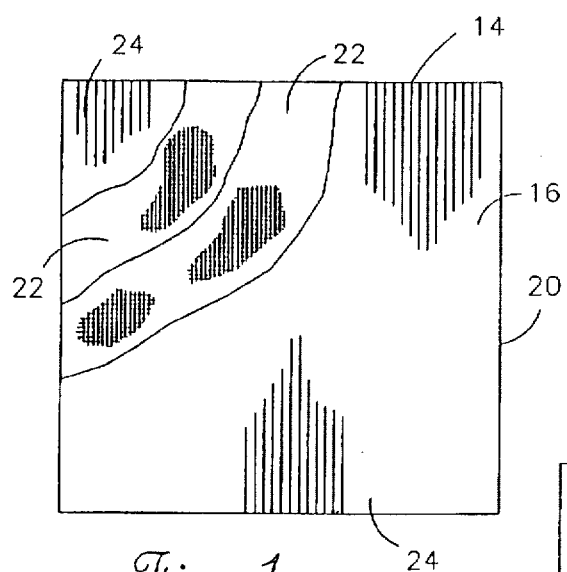
FIG. 1 is a top view in partial cutaway of the composite patch of the present invention.

A first element of the repair patch of the present invention is a base member 14, shown in FIG. 1. The base member 14 has a planar configuration with a top side 16, bottom side 18 and a periphery 20. The base member 14 may be formed as a layered element. Specifically, base member 14 includes one or more inner layers 22 of a composite material, and is preferably a woven mesh or fabric of fiberglass. A woven mesh of carbon fibers or other materials, including ceramics, may also be employed. The inner layers 22 are covered by outer layers 24 of a fire resistant plastic. This plastic may be polyester or phenolic having a flame resistant additive, or other materials. Suitable stock material for forming the base member which includes these inner and outer layers may be Conolite, obtained from Pioneer Plastics of Tennessee.

Figure 2:
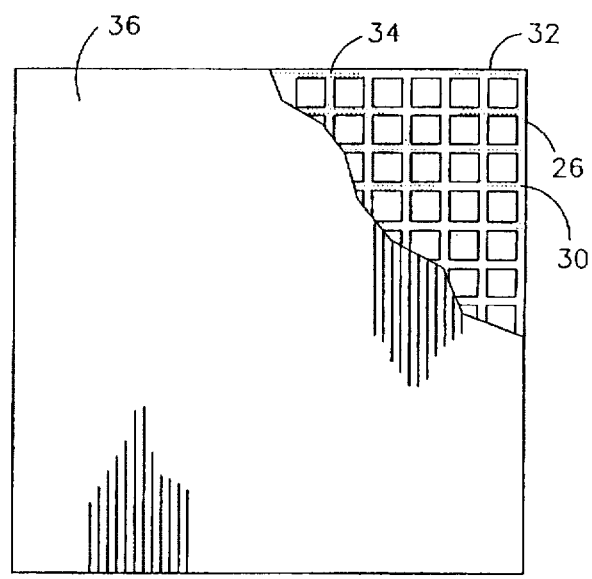
FIG. 2 is a bottom view in partial cutaway of the fiberglass scrim.

A second element of the repair patch of the present invention is a scrim 26. This is best shown in FIG. 2. The scrim 26 is preferably in the form of an open mesh lattice or screen netting of fiberglass elements connected together at their intersection. The diameters of the elements have been exaggerated in the drawings for clarity. Other materials, including carbon fibers or ceramics could also be used. Such a lattice will consist of approximately five to twenty-five elements per inch in two perpendicular directions, and will thus include relatively large void areas between the elements. Suitable stock material to form the scrim may be obtained from PermaGlas-Mesh Inc. of Ohio under product no. 207A. Scrim 26 includes a top side 28, bottom side 30 and an outer periphery 32. The periphery 32 of scrim 26 is larger than, but corresponds in shape to, periphery 20 of base member 14.

Scrim 26 includes a pressure sensitive adhesive 34 applied to the bottom side 30 thereof. The adhesive may be of any known type, and is applied across the entire bottom side 30. Alternatively, the adhesive 34 may be applied in only certain areas, such as along the periphery 32 of the scrim 26. In addition, either type of coating may be continuous or may be discontinuous, such as in the form of stripes or dots of adhesive 34.

Applied to the adhesive 34 on the bottom side of the scrim is a release sheet 36. The release sheet may be formed of wax paper, treated paper, or any other commonly known release sheet material consistent with the adhesive 34 and remaining resins described below. The release sheet 36 has a peripheral configuration corresponding essentially to the periphery 32 of the scrim 26. The release sheet 36 could, of course, extend beyond one or more peripheral edges of the scrim to provide an easily graspable edge for manual removal of the release sheet from the scrim 26.

The final component of the present repair patch is a resin material. The resin system is preferably a quick-set two-part epoxy having a catalyst or hardener mixed with a resin just prior to application of the epoxy. The epoxy resin also includes a fire resistant additive which is preferably an additive available from FireStop Chemical Corporation of Massachusetts under product no. FS152, which is added to both components of the two-part resin to comprise approximately 5% to 35% by weight. Addition of the fire resistant additive to both components ensures consistent fire resistant properties throughout the cured resin. This complete epoxy with additive is available from Akro Fire-Guard, Inc. of Kansas, under product number AF-300.

The method of applying the repair patch is as follows.

The surface of substrate 10 which is to have the repair patch applied thereto is first cleaned about the damaged area 12. Oil, grease and wax are completely removed with a cloth or paper towel in a complete area larger than that anticipated to be covered by the resin. The fiberglass scrim 26 with release sheet 36 in place may be used as a rough guide for the amount of area required to be cleaned.

The area anticipated to be covered with the resin is then abraded to provide a roughened surface. This roughened surface will provide an increased bond with the adhesives and resin. Sanding with aluminum oxide sandpaper having at least a 60 grit will provide a sufficiently abraded surface. The cleaning process is then carried out again, as stated above, to the extent necessary to remove sandpaper grit and dust.

The components of the resin are then mixed to begin the curing process. A convenient means for allowing mixing of the epoxy components is to provide a film pouch having two separate compartments, one for each of the two-part epoxy components. The compartments may be separated by a barrier in the pouch which may be broken from the exterior of the pouch. The barrier is broken, for example, by a manual twisting of the pouch, and the components are then mixed together, as by manually squeezing the pouch from one end to another. A BIPAX® kit corresponds to such a film pouch and is well suited to this application.

The pouch may then be opened to allow access to the now-mixed epoxy resin within the pouch. The epoxy resin is then squeezed out onto the bottom side 18 of base member 14 to form a resin layer 38. The resin may be applied to the entirety of the bottom side, or only on the bottom side adjacent the periphery 20. An important factor is that the resin layer 38 completely surround the damaged area 12 when applied. The resin layer could, of course, alternatively be applied to the substrate or to both the substrate and base member. The base member is then placed on the substrate 10 such that base member 14 completely covers, and resin layer 38 completely surrounds, damaged area 12.

The resin layer 38 is next allowed to partially cure to maintain base member 14 in the applied position throughout the remaining steps. To ensure that the base member does not shift position on the substrate prior to sufficient partial curing, pressure may be applied to the base member, and the pressure may be applied manually.

The application of pressure may, however, cause the resin layer 38 to be squeezed out of a localized area, resulting in the resin layer not adequately surrounding the damaged area. As such, it is preferred that base member 14 be held in position with at least one strip of adhesive tape 40. The tape 40 is manually adhered to the top side 16 of base member 14 such that tape 40 extends beyond the periphery 20, and is adhered to the substrate 10. Plural strips of tape 40 may be applied as shown in FIG. 3 to ensure that there is no movement of base member 14.

Once the resin layer has sufficiently cured to adequately prevent movement of base member 14 (approximately five minutes at a 70° ambient temperature), the remaining steps may be completed. It is noted that the tape strips 40 may be carefully removed at this point. Alternatively, the tape 40 may be left in place to become part of the repair patch. If this is the case, the tape 40 should be formed of or include fire resistant materials. A preferred tape for this arrangement is an electrical grade glass cloth coated with a pressure sensitive adhesive available from affiliated Distributors, Inc. of Texas under product no. CT-90.

The scrim 26 is next applied over the base member 14 (and possibly tape 40). The release sheet 36 is first removed from the adhesive 34 on scrim 26. The scrim 26 is then centered over the base member 14 and pressed into place. During this centering it is important that the periphery 32 of scrim 26 extends beyond the periphery 20 of base member 14 along the entire periphery 32 of scrim 26. Pressure is then applied to the scrim 26 until the scrim is firmly bonded to both the base member 14 (and possibly tape 40) and the substrate 10 beyond the periphery 20 of base member 14. If the scrim includes adhesive only about the periphery thereof the scrim will, of course, be adhesively bonded only to the substrate beyond the base member 14. Even in this situation, however, the scrim will at least overlie the base member.

The partially completed repair patch is now ready for application of an epoxy resin coating 42, and as such the components of the epoxy are mixed together to form the quick-setting epoxy resin. The resin for the coating 42 includes a flame resistant additive. It is preferred, but not required, that resin coating 42 be formed of the same constituents as the resin layer 38. The components of the resin coating 42 could thus be provided in a pouch similar to that described above with regard to resin layer 38.

Additionally, a single pouch could be provided, with this pouch containing a sufficient quantity of resin to form both resin layer 38 and resin coating 42. This is possible when the tape 40 is employed. This tape 40 will adequately hold the base member against movement during the application of the scrim and resin coating 42. As such, there is no need to wait for the resin layer 38 to partially cure. The resin remaining in the single pouch will therefore still be sufficiently fluid for application of resin coating 42, even after placing the base member in position, applying the tape 40 and placing the scrim.

A new pouch is next opened to allow access to the now-mixed epoxy resin within the new pouch, or the previous pouch, containing the remainder of the resin, is readied. The epoxy resin is then squeezed out onto the top side 28 of the scrim 26, and the top side 16 of base member 14 (and possibly the tape 40), accessible through the voids in scrim 26.

The epoxy resin is applied and spread out to form a substantially uniform coating 42 of epoxy resin. During the spreading of the epoxy across the scrim and base member, areas of reduced resin coating ("starving") should be avoided. The epoxy resin is spread across the surface of the base member and scrim, at least in the region of the periphery of the base member, and may be spread to extend beyond the periphery 32 of scrim 26, such that the resin coating 42 contacts the substrate 10 beyond the scrim 26.

When the resin coating 42 has been adequately formed, the epoxy is allowed to cure. It is preferred that this curing be complete in approximately five minutes at an ambient temperature of 70° F. Longer curing times may increase the operability of the patch by reducing the amount of smoke produced during flame impingement. A completed patch is shown in FIGS. 4 and 5. The thicknesses of the layers in FIG. 5 have been exaggerated for clarity.

As can be seen in FIG. 4, the epoxy contacts the top side 16 of base member 14 in the void areas of scrim 26. As such, when the resin coating 42 cures, the coating 42, scrim 26, base member 14 (and possibly tape 40) and substrate 10 will be united in a rigid integral manner. It is noted, however, that the resin layer 38 and coating 42 do not permeate the base member 14 when the base member includes the outer plastic layers.

The resin coating 42, as shown in FIG. 4, completely covers the scrim 26 and base member 14. As the resin coating 42 includes a fire resistant additive, the resin coating will act as a flame barrier to protect the base member 14. The resin, due to the flame resistant additive, will swell under the extreme temperature of impinging flames. It will also tend to become brittle and crack after continued flame impingement. The scrim 26, however, is embedded within the resin coating and acts to hold the coating in place even after fairly extensive cracking. This allows the resin coating 42 to remain in place a sufficient amount of time to provide adequate fire protection.

The base member 14 (in particular the outer layers 24) and resin layer 38 also act as flame barriers. The resin layer 38, disposed about the periphery of the damaged area, and base member 14 may help prevent smoke from passing through the damaged area of the substrate 10. This is an important feature, since such smoke might possibly enter the cabin area of the aircraft and cause incapacitation or death of the passengers or crew. In this regard it is noted that the resin layer 38 should not be applied too thickly to avoid cracking of the resin layer during swelling caused by flame impingement.

In order to insure adequate structural integrity and flame resistance, it is preferred that the base member overlap or extend beyond the damaged area 12 by at least one inch about the entire periphery of damaged area. It is also preferred that scrim 26 overlap or extend beyond base member 14 by at least one inch about the entire periphery 20 of base member.

Similarly, the epoxy layer 38 may extend beyond the periphery 32 of scrim 26. The total amount of epoxy is, however, also important. Specifically, too little epoxy will result in the repair patch providing insufficient flame resistance. On the other hand, too much epoxy will result in excessive amount of smoke being produced if flame impinges upon the repair patch. A preferred amount of resin is between 0.5 and 2.0 grams of resin per square inch of scrim, with 1.25 grams per square inch being most preferred.

These minimum overlaps may be best achieved by providing pre-formed base members 14 and scrims 26 in standard sizes. For example, a three by three inch, six by six inch, eight by eight inch or twelve by twelve inch base member 14 could be provided in kit form with a five by five inch, eight by eight inch, ten by ten inch or fourteen by fourteen inch, respectively, scrim 26. This eliminates the need for manually cutting the base member and scrim to size at the job site, and ensures that the minimum base member overlap is always achieved.

To further simplify the repair process and ensure the proper amount of epoxy resin, the pre-formed base members 14 and scrims 26 could be provided in kits which include a base member 14, a scrim 26, strips of tape 40 and a pouch (or pair of pouches) containing the epoxy components. A sheet of sandpaper of appropriate grit, and perhaps a spreader member to assist in forming resin layer 38 and coating 42, could also be included for completeness.

While the invention has been described in detail above, various modifications are considered to be within the scope of this invention. For example, the particular element spacing and mesh configuration of the scrim 26 may be modified. Various other standardized patch sizes may also be envisioned. As such, the present invention is not intended to be limited by the above description, but only by the scope of the claims appended hereto.

What is claimed is:

1. A method of repairing a damaged area of a fire resistant container comprising the steps of:
   providing:
   a fire resistant base member having a top side, a bottom side and a periphery
   a scrim defining an open mesh lattice; and
   at least one quantity of fire resistant resin which swells the temperature of impinging flames;
   applying a layer of said resin to said bottom side of said base member or the fire resistant container surrounding the damaged area, and thereafter securing said base member to the fire resistant container with said layer completely surrounding the damaged area and said periphery of said base member surrounding the damage area such that said base member completely covers the damaged area;
   placing said scrim in a position overlying said top side of said base member;
   applying a coating of said resin to said top side of said base member and said scrim to thereby embed said scrim within said resin; and
   allowing said resin to cure.

2. A method as in claim 1, wherein said step of providing a scrim comprises said scrim including a pressure sensitive adhesive on at least said portions of said bottom surface of said scrim.

3. A method as in claim 1, wherein said step of providing a scrim comprises said scrim comprising fiberglass elements.

4. A method as in claim 3, wherein said step of providing fiberglass elements comprises providing a first plurality of elements arranged substantially parallel to each other and a second plurality of elements arranged substantially parallel to each other and substantially perpendicular to, and within the plane of, said first plurality of elements, each plurality of elements having a spacing of 9 to 11 elements per inch.

5. A method as in claim 4, wherein said step of providing a scrim comprises said scrim including a pressure sensitive adhesive on at least said portions of said bottom surface of said scrim.

6. A method as in claim 1, wherein said providing step further comprises providing at least one strip of adhesive tape, and said method further comprising, subsequent to said step of securing said base member, and prior to said step of placing said scrim, the step of:

placing said adhesive tape at a position crossing said periphery of said base member and adhesively securing said adhesive tape to said base member and the fire resistant container, whereby said adhesive tape resists movement of said base member with respect to the fire resistant container container.

7. A method as in claim 6, wherein said step of providing at least one strip of adhesive tape comprises providing at least one strip of glass cloth, each said strip having pressure sensitive adhesive on one side thereof.

8. The method of claim 1, wherein said step of providing said scrim further comprises said scrim including a periphery, said scrim periphery being larger than said base member periphery, and wherein said step of placing said scrim further comprises completely surrounding said base member periphery with said scrim such that a peripheral portion of said scrim extends beyond said base member periphery.

9. The method of claim 8, wherein said step of providing said scrim further comprises said scrim including an adhesive on a bottom side of said scrim, and wherein said step of placing said scrim further comprises at least adhesively securing said peripheral portion of said scrim to the fire resistant container.

10. A method of repairing a damaged area of a fire resistant container comprising the steps of:

applying a layer of fire resistant resin which swells under the temperature of impinging flames around the damaged area of the container or to a bottom side of a fire resistant patch member;

securing the patch member to the container with the patch member extending over the damaged area and the layer of intumescent material;

applying a second layer of the fire resistant resin over a top side of the patch member; and allowing the layers of resin to cure.

11. The method as claimed in claim 10, further comprising the step of:

placing a scrim over the top side of the patch member before said step of applying a second layer.

* * * * *

UNITED STATES PATENT AND TRADEMARK OFFICE
CERTIFICATE OF CORRECTION

PATENT NO. : 5,705,006
DATED : January 6, 1998
INVENTOR(S) : Roudebush

It is certified that error appears in the above-identified patent and that said Letters Patent is hereby corrected as shown below:

Column 6, line 46, after the word periphery, insert --;--.

Column 6, line 56, delete "damage" and substitute --damaged--.

Signed and Sealed this

Twenty-first Day of April, 1998

Attest:

BRUCE LEHMAN

Attesting Officer    Commissioner of Patents and Trademarks